United States Patent [19]
Brog et al.

[11] Patent Number: 5,183,610
[45] Date of Patent: Feb. 2, 1993

[54] ALUMINA-ZIRCONIA CERAMIC

[75] Inventors: Terrence K. Brog, Littleton, Colo.; William R. Manning, Richmond, Mich.

[73] Assignee: Cooper Indusries, Inc., Houston, Tex.

[21] Appl. No.: 647,197

[22] Filed: Dec. 20, 1990

Related U.S. Application Data

[63] Continuation-in-part of Ser. No. 287,693, Dec. 20, 1988, abandoned, which is a continuation-in-part of Ser. No. 76,439, Jul. 22, 1987, abandoned.

[51] Int. Cl.$^5$ .............................................. C04B 35/10
[52] U.S. Cl. .................................... 264/56; 501/104; 501/105; 501/127; 501/153
[58] Field of Search ............... 501/104, 105, 127, 153; 264/56

[56] References Cited

U.S. PATENT DOCUMENTS

| | | | |
|---|---|---|---|
| 3,686,007 | 8/1972 | Gion | 106/46 |
| 3,916,585 | 11/1975 | Barks | 501/105 |
| 4,298,385 | 11/1981 | Claussen et al. | 501/105 |
| 4,533,647 | 8/1985 | Tien | 501/105 |
| 4,552,852 | 11/1985 | Manning | 501/105 |
| 4,587,225 | 5/1986 | Tsukuma et al. | 501/105 |
| 4,659,680 | 4/1987 | Guile | 501/104 |
| 4,666,467 | 5/1987 | Matsumoto et al. | 51/369 |
| 4,772,576 | 9/1988 | Kimura | 501/102 |
| 4,804,645 | 2/1989 | Ekstrom | 501/105 |

FOREIGN PATENT DOCUMENTS

| | | | |
|---|---|---|---|
| 58-172265 | 10/1983 | Japan | 501/105 |
| 59-174574 | 10/1984 | Japan | 501/105 |
| 60-21861 | 2/1985 | Japan | 501/105 |
| 60-77406 | 5/1985 | Japan | 501/105 |
| 61-201661 | 9/1986 | Japan . | |

OTHER PUBLICATIONS

Journal of the American Ceramic Society, vol. 40, No. 4, Apr. 1957, p. 134 et seq.

Primary Examiner—James Derrington
Attorney, Agent, or Firm—John C. Purdue; David C. Purdue

[57] ABSTRACT

A method for producing a ceramic is disclosed. The method involves comminuting a batch composed of from 6 to 95 percent of particulate $ZrO_2$ and from 5 to 94 percent of particulate $Al_2O_3$. A part of the particulate $ZrO_2$ is in a metastable tetragonal crystal structure, for example, as a consequence of $3^{m/o}$ of $Y_2O_3$ dissolved therein and a part has a monoclinic crystal structure. The comminuted batch is compacted into a shape, and the shape is fired. The degree of comminution of the batch, the firing conditions and the proportions of stabilized and monoclinic $ZrO_2$ in the batch are controlled to produce a dense, gas impervious ceramic which contains both metastable tatragonal and monoclinic $ZrO_2$, and in such proportions that the ceramic has improved strength by comparison with an otherwise identical ceramic wherein all of the $ZrO_2$ is in either a metastable tetragonal or a monoclinic crystal structure.

Also disclosed is a method where the particulate alumina can be an alumina-chromia solid solution containing up to $50^{m/o}$ of chromia.

In another embodiment, a ceramic article is disclosed. The article is composed of from 6 to 95 percent of particulate $ZrO_2$, from 5 to 94 percent of particulate $Al_2O_3$, from $\frac{1}{4}$ to $3\frac{3}{4}$ percent of $MnO_2$ and from $\frac{1}{4}$ to $3\frac{3}{4}$ percent of $TiO_2$.

4 Claims, No Drawings

ALUMINA-ZIRCONIA CERAMIC

REFERENCE TO RELATED APPLICATIONS

This is a continuation of application Ser. No. 07/287,693, filed Dec. 20, 1988, now abandoned, itself a continuation in part of application Ser. No. 07/076,439, filed Jul. 22, 1987, now abandoned.

DEFINITIONS

As used herein, and in the appended claims, the terms "percent" and "parts" refer to percent and parts by weight, unless otherwise indicated; g means gram or grams; cm means centimeter or centimeters; mm means millimeter or millimeters; m/o means mole percent, and equals 100 times the number of moles of the constituent designated in a composition divided by the total number of moles in the composition; psi means pounds per square inch; and MPa means $10^6$ Pascals.

All temperatures herein are in degrees C., unless otherwise indicated.

BACKGROUND OF THE INVENTION

1. Field of the Invention

This invention relates to an alumina ceramic containing additions of zirconia and of yttria-stabilized zirconia; the ceramic can be one in which some of the particles of zirconia and yttria-stabilized zirconia are in the metastable tetragonal and some are in the monoclinic crystal structure. Further, additions of manganese oxide and titanium oxide can be made to this and other alumina ceramics containing zirconia and stabilized zirconia to achieve significant strengthening at lower firing temperatures.

2. The Prior Art

Various alumina ceramics with additions of zirconia have been suggested. For example, U.S. Pat. No. 4,298,385, Claussen, discloses that additions of zirconia or hafnia to alumina increase the fracture toughness. It has been found, however, that, at high zirconia contents, it is difficult to retain a sufficient amount of the zirconia in the metastable tetragonal structure, and that the zirconia particles must be smaller than 0.5 μm.

Another U.S. Pat. No. 4,316,964, Lange, discloses alumina ceramics with additions of zirconia, which can be stabilized with one or more of $Y_2O_3$, $CeO_2$, $La_2O_3$, and $Er_2O_3$ for the purpose of stabilizing a reasonable amount of the zirconia in the metastable tetragonal symmetry.

Still another U.S. Pat. No. 4,533,647, Tien, discloses modified alumina-zirconia composites. In one modification, chromia is present in solid solution in the alumina to increase the hardness and elastic modulus of the "matrix". In another modification, hafnia is used with the zirconia for the purpose of increasing the temperature at which the tetragonal to monoclinic transformation occurs, and, supposedly, as a consequence, to increase the fracture toughness, although it was found later that the increase in fracture toughness does not necessarily occur.

Further, U.S. Pat. No. 4,552,852, Manning, discloses alumina ceramics with zirconia or hafnia additions and a glass-phase. The material shows an improvement in thermal shock resistance.

Also, the U.S. Pat. No. 4,587,225, Tsukuma, discloses composite ceramics of alumina and zirconia to which yttria additions have been made. The ceramic is produced by hot pressing, which enables the use of both lower temperatures and shorter times than would otherwise be required. This patent claims a high-strength material which is probably achieved, in part, as a consequence of the hot pressing.

A high strength metal working tool is disclosed by U.S. Pat. No. 4,666,467, Matsumoto et al. The tool is made from a sintered material comprising 50 to 98 percent of zirconia containing 1.5 to 5 m/o of yttria and 50 to 2 percent of alumina or spinel.

A method for producing zirconia bodies partially stabilized with yttria and a secondary stabilizer is disclosed by U.S. Pat. No. 4,659,680, Guile. The method involves sintering a shaped batch, cooling the shape quickly to a temperature within the range of 1000° to 1475°, holding the shape at a temperature within the indicated range to cause precipitation of tetragonal $ZrO_2$ as islands within cubic $ZrO_2$ grains, and cooling to room temperature.

In addition, Cutler, Bradshaw, Christensen and Hyatt have disclosed that 96 percent alumina bodies containing small additions of $MnO_2$ and $TiO_2$ have been produced at sintering temperatures in the range of 1300° to 1400°, *Journal of the American Ceramic Society*, Volume 40, No. 4, April, 1957, pages 134 et seq.

Finally, U.S. Pat. No. 3,686,007, Gion, discloses the use of a mixture of $TiO_2$ and $MnO_2$ as a flux in alumina ceramics containing relatively large amounts of ball clay and feldspar.

SUMMARY OF THE INVENTION

The instant invention is based upon the discovery of a ceramic which consists essentially of from 6 to 95 percent of particulate $ZrO_2$ and from 5 to 94 percent of particulate $Al_2O_3$, and in which a part of the $ZrO_2$ is in a metastable tetragonal crystal structure as a consequence of 3 m/o yttria dissolved therein to promote retention of the metastable tetragonal crystal structure and a part has a monoclinic structure. The particulates are bonded to one another to form a dense, gas impervious structure. The ceramic is produced by comminuting a batch having the indicated composition, compacting the comminuted batch into a shape, firing the shape, and controlling the degree of communication of the batch, the firing conditions and the properties of metastable tetragonal and monoclinic $ZrO_2$ in the batch so that the fired shape is a dense, gas impervious ceramic which contains both metastable tetragonal and monoclinic $ZrO_2$, and in such proportions that the ceramic has improved strength by comparison with an otherwise identical ceramic wherein all of the $ZrO_2$ is in either a metastable tetragonal or a monoclinic crystal structure. Other oxides, particularly MgO, can be used to stabilize the tetragonal $ZrO_2$, but it is usually preferred that $Y_2O_3$ be used, and about the minimum amount that is required for stabilization. While approximately 9 percent of $Y_2O_3$ is required for complete stabilization of $ZrO_2$, it has been found that $ZrO_2$ stabilized with as little as 5 percent of $Y_2O_3$ is significantly advantageous in a ceramic according to the invention. The particulates should have an ultimate particle size finer than 15 μm. In another embodiment, the ceramic consists essentially of from 6 to 95 percent of particular $ZrO_2$, a part of which is in a metastable tetragonal crystal structure and a part of which has a monoclinic structure, as set forth above, from 5 to 94 percent of particulate $Al_2O_3$, and an amount of a sintering aid, e.g., 1 percent of $MnO_2$—$TiO_2$, sufficient to reduce significantly the firing temperature required to produce a dense, gas impervious ceramic from a pressed green body. Indeed, the use of a sintering aid such as $MnO_2$—$TiO_2$ is of significant benefit, generally, in alumina ceramics which contain $ZrO_2$. The ceramic can also contain a glass which is a calcium magnesium silicate glass containing from 45 to 80 percent of $SiO_2$, from 8 to 55 percent of CaO and MgO, and not more than 15 percent of $Al_2O_3$. Preferably, the glass constitutes from 3 to 12 percent of the ceramic, most desirably from 5 to 12 percent.

Available data indicate that a large increase in strength as measured by the modulus of rupture is achieved when both $ZrO_2$ and metastable tetragonal $ZrO_2$ are present in an alumina ceramic; the increase is by comparison with the alumina ceramic with no $ZrO_2$ addition, by comparison with the alumina ceramic to which monoclinic $ZrO_2$ has been added, and, also, by comparison with the alumina ceramic to which yttria stabilized $ZrO_2$ has been added.

DESCRIPTION OF THE PREFERRED EMBODIMENTS

The following examples are presented solely for the purpose of further illustrating and disclosing the invention. They are to be construed as illustrative, and not as limiting. Example 1 constitutes the best mode presently contemplated by the inventors.

EXAMPLE 1

A ceramic batch composed of 79.2 parts of $Al_2O_3$, 10.4 parts of monoclinic $ZrO_2$, 10.4 parts of yttria 3 m/o stabilized $ZrO_2$, 4 parts of a binder that is commercially available under the trade designation Mobilcer X and 0.4 part of a dispersant that is commercially available under the trade designation Darvan C was wet milled at 67 percent solids for one hour. The resulting batch was dried to a powder under an infra red lamp; the powder was then sieved twice, first through a 20 mesh screen and then through a 60 mesh screen. The sieved batch was then pressed isostatically at 5000 psi. (about 35 MPa) around a cylindrical mandrel which has a diameter of about 4.8 mm, and the pressed shape was calcined at 871° for one hour; the calcined shape was rotated and ground by contact with a rotating grinding wheel to produce a stepped cylindrical blank with an internal bore which has a diameter of about 4.6 mm, a stem portion which had a length of about 59.9 mm and a diameter of about 9.2 mm, and a base portion which had a length of about 5.5 mm and a diameter of about 18.4 mm. The stepped cylindrical blank was placed on a setter and fired in a gas-fired tunnel kiln with a slightly reducing atmosphere; the firing cycle involved heating in about seventeen hours from 20° to 1550°, about 1½ hours at 1550° and cooling. The fired ceramic which resulted had an internal bore about 4 mm in diameter and an overall length of 57 mm; the stem portion had a length of 53 mm and an outside diameter of 6.6 mm, while the base portion had a length of 4 mm and an outside diameter of 14.3 mm. A batch of 12 ceramic pieces produced as described in this Example was found to have a modulus of rupture measured in three point loading of 78490±7410 psi.

The yttria-stabilized $ZrO_2$ used as described above in Example 1 is commercially available from Zirconia Sales, America, under the trade designation HSY-3. The material has a median particle size of about 0.8 μm; it consists of $ZrO_2$ plus 3 m/o $Y_2O_3$, assay 99.3 percent, and incidental impurities.

The monoclinic $ZrO_2$ used as described above in Example 1 is commercially available from Zirconia Sales, America, under the trade designation DK-1. The material has a median particle size of about 0.1 μm; it consists of $ZrO_2$, assay 99.7 percent, and incidental impurities.

The $Al_2O_3$ used as described above in Example 1 is commercially available from Aluminum Company of America under the designation A39SG alumina. The material has a median ultimate particle size less than 1 micron; it consists of $Al_2O_3$, assay 99.9 percent, and incidental impurities.

The Mobilcer X binder used as described above in Example 1 is a microcrystalline wax emulsion commercially available from Mobil Oil Corporation under the indicated trade designation.

The Darvan C dispersant used as described above in Example 1 is an ammonium polyelectrolyte commercially available from R.T. Vanderbilt Company, Inc.

For purposes of comparison, but not in accordance with the instant invention, the procedure of Example 1 was repeated, except that, in one case, all of the $ZrO_2$ in the batch (20.8 parts) was yttria stabilized zirconia and, in another case, all of the $ZrO_2$ (20.8 parts) was monoclinic; the fired ceramics had a modulus of rupture of 70770±9730 psi and 49840±6810 psi, respectively.

EXAMPLES 2, 3 AND 4

The procedure of Example 1 was repeated to produce ceramic according to the invention and control ceramic pieces, using alumina from different sources, as follows: "a", dry ball milled alumina that is available under the trade designation HPA from Arco Chemical Company; "b", alumina that is available under the trade designation RC-HP DBM from Reynolds International, Inc.; and "c", alumina that is available under the trade designation A16SG from Aluminum Company of America. The type of alumina, the parts of monoclinic zirconia, "$ZrO_2$m", the parts of yttria stabilized zirconia, "$ZrO_2$s", and the modulus of rupture of each of the ceramics produced are set forth in the following table:

|  | $Al_2O_3$ | $ZrO_2$ m | $ZrO_2$ s | MOR, psi |
| --- | --- | --- | --- | --- |
| Example 2 | a | 10.4 | 10.4 | 83240 ± 10310 |
| Control "A" | a | 20.8 | — | 40999 ± 2290 |
| Control "B" | a | — | 20.8 | 67181 ± 5930 |
| Example 3 | b | 10.4 | 10.4 | 89634 ± 6829 |
| Control "C" | b | 20.8 | — | 46321 ± 2651 |
| Control "D" | b | — | 20.8 | 84830 ± 6582 |
| Example 4 | c | 10.4 | 10.4 | 72241 ± 9525 |
| Control "E" | c | 20.8 | — | 38828 ± 3164 |
| Control "F" | c | — | 20.8 | 65866 ± 8038 |

EXAMPLES 5 AND 6

The procedure of Example 1, except that Darvan 821A was used as a dispersant instead of the Darvan C, was also repeated to produce ceramics according to the invention and control ceramic pieces from batches composed of 20.0 parts of alumina b and 80 parts of monoclinic zirconia, stabilized zirconia, or a mixture of the two. Darvan 821-A is also an ammonium polyelectrolyte which is commercially available from R.T. Vanderbilt Company, Inc. the identity of the zirconia component of each batch and the modulus of rupture of each of the ceramics are set forth in the following table:

|  | ZrO$_2$ m | ZrO$_2$ s | MOR, psi |
| --- | --- | --- | --- |
| Example 5 | 10 | 70 | 104492 ± 10827 |
| Control "G" | — | 80 | 97363 ± 10827 |
| Example 6 | 20 | 60 | 116928 ± 10827 |
| Control "H" | 30 | 50 | 24905 ± 2247 |
| Control "I" | 40 | 40 | 33505 ± 2815 |

EXAMPLES 7 AND 8

The procedures of Examples 5 and 6, except that the pressing pressure was 8000 psi (approximately 55 MPa), have been repeated to produce ceramic pieces according to the invention and control samples. The identity of the zirconia component of each batch and the modulus of rupture of each of the insulators are set forth in the following table:

|  | ZrO$_2$ m | ZrO$_2$ s | MOR, psi |
| --- | --- | --- | --- |
| Example 7 | 10 | 70 | 112428 ± 11361 |
| Control "J" | — | 80 | 105770 ± 8190 |
| Example 8 | 20 | 60 | 122775 ± 9983 |
| Control "K" | 30 | 50 | 23854 ± 2884 |
| Control "L" | 40 | 40 | 30138 ± 2238 |

EXAMPLES 9-11

A procedure similar to that of Example 1, except that the alumina used was one that is available under the trade designation RC-HP DBM from Reynolds International, Inc. was used to produce samples according to the invention. In addition, 1 percent of the initial charge was of a 50 percent MnO$_2$-50 percent TiO$_2$ mixture. Both the MnO$_2$ and the TiO$_2$ were of reagent grade, available from J.T. Baker Chemical Company. The pieces were calcined at 600° for 1 hour prior to turning. The cylindrical pieces were then fired for 3 hours at 1350°. The identity of the zirconia component of each batch and the modulus of rupture of each of the sets of samples are set forth in the following table:

|  | ZrO$_2$ m | ZrO$_2$ | MOR, psi |
| --- | --- | --- | --- |
| Example 9 | 20.0 | 20.8 | 65219 |
| Example 10 | 10.4 | 10.4 | 74505 |
| Example 11 | 20.8 | 0.0 | 64396 |
| Control "M" | 0.0 | 0.0 | 54670 |

EXAMPLES 12-14

The procedure of Examples 9-11, except that the powder was pressed at 8000 psi, was used to produce samples according to the invention. The identity of the zirconia component of each batch and the modulus of rupture of each of the sets of samples are set forth in the following table:

|  | ZrO$_2$ m | ZrO$_2$ s | MOR, psi |
| --- | --- | --- | --- |
| Example 12 | 0.0 | 20.8 | 74090 |
| Example 13 | 10.4 | 10.4 | 82577 |
| Example 14 | 20.8 | 0.0 | 69914 |

It will be understood from the data in the foregoing Examples that alumina ceramics made with some yttria stabilized zirconia and some monoclinic zirconia are unexpectedly advantageous, by comparison with otherwise identical ceramics made with yttria stabilized zirconia alone, or with monoclinic zirconia alone. It will also be appreciated from that data that comparatively small variations in the proportions of yttria stabilized zirconia and monoclinic zirconia cause drastic changes in the strength of the ceramics, as indicated by the modulus of rupture (compare, for example, the strengths of the ceramics of Examples 7 and 8 with those of the ceramics of Controls K and L). It has been found that the particle size of the batch and the firing conditions influence the proportions of metastable tetragonal and monoclinic zirconia at which optimum strength properties are achieved. Accordingly, if it is desired to practice the instant invention using a batch that is different from any of those identified above, or using different firing conditions, or both, it may be necessary to determine the proportions of metastable tetragonal and monoclinic zirconia at which the desired strengthening is achieved. This can be accomplished by preparing a series of batches analogous to those of Examples 7 and 8 and Controls J, K and L, producing ceramics, and determining their strength. It may then be desirable to prepare another series of batches where the proportions of yttria stabilized and monoclinic zirconia are intermediate those of the original series in the region where improved strength is indicated by the initial data. For example, with the batch ingredients and the firing conditions that were used for Examples 7 and 8 and for Controls J, K and L, maximum strengths were achieved with the batches which contained 10 and 20 parts of monoclinic zirconia and 70 and 60 parts of yttria stabilized zirconia; additional data for batches containing 5, 15 and 25 parts of monoclinic zirconia and 75, 65 and 55 parts of yttria stabilized zirconia should enable a reasonably close estimate of the optimum proportions of the two zirconias.

It is known that Cr$_2$O$_3$ forms solid solutions in Al$_2$O$_3$ in all proportions and that transformation toughened ceramics can be made from such solid solutions containing up to 50 m/o of Cr$_2$O$_3$ and zirconia and from such solid solutions and solid solutions of hafnia in zirconia (see, for example, Tien, supra). It follows that the method of the instant invention can be used to produce ceramics of optimum strength from solid solutions of Cr$_2$O$_3$ in Al$_2$O$_3$. To illustrate, the procedure of Example 1 of Tien can be used to produce Al$_2$O$_3$—Cr$_2$O$_3$ ceramics having an desired Cr$_2$O$_3$ content up to 50 m/o and containing any desired amount of ZrO$_2$ made up of varying proportions of monoclinic ZrO$_2$ and yttria stabilized ZrO$_2$. Modulus of rupture can then be determined as a function of the proportions of the two kinds of ZrO$_2$; additional ceramics can be made, if necessary, using different proportions, and ceramics having improved strength can then be made by a modification of the procedure of Tien Example 1 which involves using the requisite proportions of monoclinic ZrO$_2$ and yttria stabilized ZrO$_2$. Accordingly, generically, the batch that is comminuted as the first step in the method of the instant invention can be one composed of from 6 to 95 percent of particulate ZrO$_2$ and from 5 to 94 percent of particulate Al$_2$O$_3$ containing up to 50 m/o Cr$_2$O$_3$ dissolved therein in solid solution, provided that, as stated above, a part of the particulate ZrO$_2$ is in a tetragonal crystal structure as a consequence of yttria or another oxide dissolved therein to promote retention of the metastable tetragonal crystal structure and a part has a monoclinic crystal structure.

The procedure of any of the Examples of Manning, supra, can also be modified to produce ceramics having improved strength, the modification involving merely using the requisite proportions of monoclinic $ZrO_2$ and stabilized $ZrO_2$, and the requisite proportions can be determined as described above, by varying the proportions and determining modulus of rupture as a function of proportions.

It will be appreciated that the degree of comminution of the batch, the firing conditions and the proportions of oxide and of tetragonal and monoclinic $ZrO_2$ should be controlled so that the improvement in strength, by comparison with an otherwise identical ceramic wherein all of the $ZrO_2$ in the batch is in either a metastable tetragonal or a monoclinic crystal structure, is significant. For example, the strength of the ceramic, as indicated by the modulus of rupture, should be at least 5 percent, and, preferably, at least 10 percent greater than that of the stronger of two otherwise identical ceramics, one wherein all of the $ZrO_2$ in the batch is in a metastable tetragonal and one wherein all of the $ZrO_2$ in the batch is in a monoclinic crystal structure. Most desirably, it is the mean of at least 5 measurements of the modulus of rupture of a ceramic according to the invention that is at least 5 percent or 10 percent greater than the mean of at least 5 measurements of the modulus of rupture of the stronger of two otherwise identical ceramics, one wherein all of the $ZrO_2$ in the batch is in a metastable tetragonal and one wherein all of the $ZrO_2$ in the batch is in a monoclinic crystal structure.

The data of Examples 9-14 demonstrate that additions of 1 percent of a mixture of $MnO_2$ and $TiO_2$ strengthened significantly the samples according to the invention. In retrospect, it is believed that part of this strengthening is a consequence of the lowering, attributable to the $MnO_2$—$TiO_2$, of the firing temperature required to produce the samples. It will be appreciated that the strengthened ceramics can be produced by the methods disclosed by the reference cited above, but using lowered firing temperatures. Accordingly, ceramics according to this aspect of the instant invention consist essentially of from 6 to 95 percent of particulate $ZrO_2$, a part of which is in a metastable tetragonal crystal structure and a part of which has a monoclinic structure, as set forth above, from 5 to 94 percent of particulate $Al_2O_3$, from $\frac{1}{4}$ to $3\frac{3}{4}$ percent of $MnO_2$ and from $\frac{1}{4}$ to $3\frac{3}{4}$ percent of $TiO_2$. Preferably, the $MnO_2$ and the $TiO_2$ are present in approximately equal proportions and constituted, together, from about 1 to about 3 percent of the ceramic.

It will be apparent that various changes and modifications can be made from the details of the invention as specifically disclosed herein without departing from the spirit and scope thereof as defined in the appended claims.

I claim:

1. A method for producing a ceramic which consists essentially of formulating a batch composed of from 6 to 95 percent of particulate $ZrO_2$ and from 5 to 94 percent of particulate $Al_2O_3$ from particulate $Al_2O_3$, particulate $ZrO_2$ is in a tetragonal crystal structure as a consequence of an oxide dissolved therein to promote retention of the metastable tetragonal crystal structure and particulate $ZrO_2$ which has a monoclinic crystal structure, comminuting the batch, compacting the comminuted batch into a shape, firing the shape, and controlling the degree of comminution of the batch, the firing conditions and the proportions of oxide and of tetragonal and monoclinic $ZrO_2$ in the batch to produce a dense, gas impervious ceramic which contains both metastable tetragonal and monoclinic $ZrO_2$, and in such proportions that the ceramic has a strength, as indicated by the modulus of rupture, at least 5 percent greater than that of the stronger of two otherwise identical ceramics, one wherein all of the $ZrO_2$ in the batch is in a metastable tetragonal and one wherein all of the $ZrO_2$ in the batch is in a monoclinic crystal structure.

2. A method for producing a ceramic which consists essentially of formulating a batch composed of from 6 to 95 percent of particulate $ZrO_2$ and from 5 to 94 percent of particulate $Al_2O_3$ containing up to 50 m/o $Cr_2O_3$ dissolved therein in solid solution from particulate $Al_2O_3$ containing up to 50 m/o $Cr_2O_3$ dissolved therein in solid solution, particulate $ZrO_2$ is in a tetragonal crystal structure as a consequence of an oxide dissolved therein to promote retention of the metastable tetragonal crystal structure and particulate $ZrO_2$ which has a monoclinic crystal structure, comminuting the batch, compacting the comminuted batch into a shape, firing the shape, and controlling the degree of comminution of the batch, the firing conditions and the proportions of oxide and of tetragonal and monoclinic $ZrO_2$ in the batch to produce a dense, gas impervious ceramic which contains both metastable tetragonal and monoclinic $ZrO_2$, and in such proportions that the ceramic has a strength, as indicated by the modulus of rupture, at least 5 percent greater than that of the stronger of two otherwise identical ceramics, one wherein all of the $ZrO_2$ in the batch is in a metastable tetragonal and one wherein all of the $ZrO_2$ in the batch is in a monoclinic crystal structure.

3. A method as claimed in claim 1 for producing a ceramic wherein the degree of comminution of the batch, the firing conditions and the proportions of oxide and of tetragonal and monoclinic $ZrO_2$ in the batch are controlled to produce a dense, gas impervious ceramic which contains both metastable tetragonal and monoclinic $ZrO_2$, and in such proportions that the ceramic has a strength, as indicated by the modulus of rupture, at least 10 percent greater than that of the stronger of two otherwise identical ceramics, one wherein all of the $ZrO_2$ in the batch is in a metastable tetragonal and one wherein all of the $ZrO_2$ in the batch is in a monoclinic crystal structure.

4. A method as claimed in claim 3 for producing a ceramic wherein the degree of comminution of the batch, the firing conditions and the proportions of oxide and of tetragonal and monoclinic $ZrO_2$ in the batch are controlled to produce a dense, gas impervious ceramic which contains both metastable tetragonal and monoclinic $ZrO_2$, and in such proportions that the ceramic has a strength, as indicated by the modulus of rupture, at least 10 percent greater than that of the stronger of two otherwise identical ceramics, one wherein all of the $ZrO_2$ in the batch is in a metastable tetragonal and one wherein all of the $ZrO_2$ in the batch is in a monoclinic crystal structure.

* * * * *

UNITED STATES PATENT AND TRADEMARK OFFICE
CERTIFICATE OF CORRECTION

PATENT NO. : 5,183,610
DATED : February 2, 1993
INVENTOR(S) : Brog et al.

It is certified that error appears in the above-identified patent and that said Letters Patent is hereby corrected as shown below:

Column 2, line 45 should read
    the firing conditions and the proportions of metastable
Column 3, line 41 should read
    MPa) around a cylindrical mandrel which had a diame-
Column 4, line 4 should read
    material has a median particle size of about 1.0μm; it
Column 5, line 64 should read
    It will be appreciated from the data in the foregoing
Column 6, line 46 should read
    ics having any desired $Cr_2O_3$ content up to 50 m/o and
Column 7, line 61 should read
    $ZrO_2$ in a tetragonal crystal structure as a conse-
Column 8, line 20 should read
    in solid solution, particulate $ZrO_2$ in a tetragonal Signed and Sealed this Thirtieth Day of November, 1993

Attest:

BRUCE LEHMAN

Attesting Officer     Commissioner of Patents and Trademarks